United States Patent [19]

Hirata et al.

[11] Patent Number: 5,219,708
[45] Date of Patent: Jun. 15, 1993

[54] OPTICAL DISK

[75] Inventors: Hideki Hirata; Keiji Koga, both of Saku; Toshihiko Ishida, Komoro, all of Japan

[73] Assignee: TDK Corporation, Tokyo, Japan

[21] Appl. No.: 802,396

[22] Filed: Dec. 4, 1991

Related U.S. Application Data

[63] Continuation-in-part of Ser. No. 517,179, May 1, 1990.

[30] Foreign Application Priority Data

May 2, 1989 [JP] Japan .................................. 1-113132
May 2, 1989 [JP] Japan .................................. 1-113133

[51] Int. Cl.$^5$ .............................................. G11B 7/24
[52] U.S. Cl. ...................................... 430/271; 430/495; 430/945; 346/135.1; 369/286; 369/288
[58] Field of Search ............... 430/271, 495, 945, 272, 430/273; 346/135.1; 369/283, 284, 286, 288

[56] References Cited

U.S. PATENT DOCUMENTS

| | | | |
|---|---|---|---|
| 4,069,487 | 1/1978 | Kasai et al. | 430/348 |
| 4,450,452 | 5/1984 | Ando et al. | 346/135.1 |
| 4,503,531 | 3/1985 | Kato | 369/275 |
| 4,668,573 | 5/1987 | Terao et al. | 428/336 |
| 4,686,543 | 8/1987 | Tani et al. | 346/137 |
| 4,906,556 | 3/1990 | Nishikawa et al. | 430/271 |
| 4,959,252 | 9/1990 | Bonnebat et al. | 428/64 |
| 5,053,288 | 10/1991 | Hashimoto et al. | 428/694 |
| 5,077,120 | 12/1991 | Kato et al. | 428/200 |

FOREIGN PATENT DOCUMENTS

| | | | |
|---|---|---|---|
| 59-065950 | 4/1984 | Japan | 369/284 |
| 61-214245 | 9/1986 | Japan | 369/283 |
| 1-133238 | 5/1989 | Japan | 369/283 |
| 1-165050 | 6/1989 | Japan . | |
| 2-108257 | 4/1990 | Japan | 369/286 |

*Primary Examiner*—Hoa Van Le
*Assistant Examiner*—John A. McPherson
*Attorney, Agent, or Firm*—Oblon, Spivak, McClelland, Maier & Neustadt

[57] ABSTRACT

An optical disk is configured as comprising a pair of substrates one of which has a recording layer borne thereon, the substrates being joined together through an adhesive so that the recording layer is interposed therebetween. In one form, one of the substrates is of glass, the other substrate is of a resin. In another form, both the substrates are of glass or resin. Delamination is prevented by using the adhesive having a specific glass transition temperature, Young's modulus, and dynamic loss factor.

6 Claims, 1 Drawing Sheet

FIG. 1

OPTICAL DISK

CROSS-REFERENCE TO RELATED APPLICATION

The present application is a continuation-in-part application of copending U.S. Pat. application Ser. No. 07/517,179, filed May 1, 1990.

This invention relates to optical disks including magnetooptical recording disks, phase transition type optical recording disks, pit forming type optical recording disks, and read only optical disks.

BACKGROUND OF THE INVENTION

In general, optical disks, especially optical recording disks have a structure in which a recording layer is formed on a substrate. Recording and reproducing operation is carried out by directing light, typically a laser beam to the recording layer through the substrate. Since the substrate has to be transparent, it is usually formed of glass or a resin. Most often, resinous substrates are used in the prior art optical disks for light weight and ease of formation of tracking grooves and recording pits.

To achieve a high transfer rate, it is recently required to rotate the disks at high revolutions during recording and reproducing operation. However, resinous substrates are less stiff or rigid so that dynamic axial runout occurs during operation, and more focus tracking errors occur during high revolution driving at 1,800 r.p.m. or higher, especially 3,000 r.p.m. or higher. To meet the recent demand for high revolution driving, the use of substrates of glass having high mechanical strength must be considered. Unfortunately, glass substrates are prone to break when disks are accidentally dropped or struck. In particular, substrates of chemically tempered glass having high strength can break into scattering small fragments.

To protect the recording layer from mechanical failures as by scratching and marring, a protective plate must be provided on the recording layer bearing side of the substrate. Alternatively, a pair of substrates are joined such that the recording layer is interposed therebetween. In order to prevent separation between a glass substrate and a protective plate due to differential thermal expansion, a choice of glass will be effective for the protective plate. If a protective plate of glass is bonded to the glass substrate, however, the resulting disk would have a total weight in excess of a critical level. It is then difficult to establish a necessary number of revolutions, especially a steady high number of revolutions. Further, the problems associated with glass substrate failure are left unsolved with the use of such a protective plate.

It would be possible to bond a resinous substrate or protective plate to a resinous substrate for preventing any mechanical damage to the recording layer and for preventing separation due to differential thermal expansion. This approach, however, cannot overcome the problem of focus tracking errors during high revolution driving.

These problems, especially the problems associated with high revolution driving can be solved by forming one of a pair of substrates or one of the substrate and the protective plate from glass and the other one from resin. There was known or available in the prior art no optical disk in which one of the paired substrates or one of the substrate and the protective plate is formed from glass and the other one is formed from resin. It was believed that a bond between glass and resin having different coefficients of thermal expansion was not recommended for optical disks which could be exposed to severe storage conditions.

U.S. Pat. No. 4,503,531 discloses that resinous substrates are joined with a hot melt adhesive having a softening point of up to 140° C., a dry tensile bond strength of at least 1 kg/cm$^2$ at 20° C., and a melt viscosity of up to 1,000 poise at 160° C. Also, Japanese Patent Application Kokai No. 165050/1989 discloses a hot melt adhesive for bonding a pair of substrates. However, these adhesives are effective only in forming a bond between resinous substrates or between a resinous substrate and a resinous plate having approximately equal coefficients of thermal expansion, but unsuitable for bonding a glass substrate and a resinous substrate or protective plate having different coefficients of thermal expansion. More particularly, if an optical disk having a glass substrate bonded to a resinous substrate or protective plate with an adhesive is stored under severe conditions at high or low temperatures, for example, at temperatures varying between −20° C. and 55° C., then stresses and strains are induced in the substrate and protective plate and even in the recording layer, protective coating, and adhesive layer due to differential thermal expansion. Therefore, in the prior art optical disks using conventional adhesives for bonding purposes, separation can occur between the substrates, between the substrate and the protective plate, between the substrate and a protective coating or another layer, or between such layers. Most conventional adhesives fail to provide reliable optical disks by integrally bonding a glass substrate and a resinous substrate or protective plate.

A similar situation occurs even when a pair of substrates are formed of the same type of material. In particular, single side recording type optical recording disks in which a resinous substrate having formed thereon necessary layers including a recording layer is integrally bonded to a resinous protective substrate have a higher coefficient of thermal expansion than glass-based disks and asymmetric deflection, stresses or strains can occur in the substrates. Under severe thermal conditions, for example, at temperatures varying between −30° C. and 65° C. at a rate of 20° C./sec., the conventional adhesives cannot prevent separation from occurring between the substrates, between the substrate and the protective substrate, between the substrate and the layer, or between the layers.

SUMMARY OF THE INVENTION

Therefore, a primary object of the present invention is to provide a novel and improved optical disk comprising a pair of substrates formed of different types of material, wherein separation does not occur between the substrates, between the substrate and the protective substrate, between the substrate and a protective coating or another layer, or between such layers even under severe thermal conditions, for example, at temperatures varying between −20° C. and 55° C., which disk undergoes neither dynamic axial runout nor deflection, thus ensuring steady high speed rotation and improved recording/reproducing properties.

Another object of the present invention is to provide a highly reliable optical disk comprising a pair of substrates formed of the same type of material, wherein separation does not occur between the substrates, between the substrate and the protective substrate, between the substrate and a protective coating or another layer, or between such layers even under severe thermal conditions, for example, at temperatures varying from −30° C. to 65° C. or vice verse at a rate of 20° C./sec.

Briefly stated, the present invention is directed to an optical disk comprising a pair of substrates and information carrying means on at least one of the substrates wherein the pair of substrates are integrated through an adhesive so as to enclose the information carrying means therebetween. According to a first aspect of the present invention, when one of the substrates is formed of glass and the other substrate is formed of a resin, the adhesive should have a glass transition temperature Tg of from −60° C. to 10° C. and a Young's modulus of from 0.005 to 0.1 kgf/mm$^2$ at 20° C. and 10 Hz. In a currently preferred embodiment, the information carrying means is on the one substrate of glass which is integrated with the protective substrate of resin. The information carrying means includes a recording layer which may contain a rare earth metal. The disk may further include a protective coating of a resin on the recording layer. Preferably, the adhesive has a Young's modulus of up to 100 kgf/mm$^2$ at −20° C. and 10 Hz and a dynamic loss factor tan$\delta$ of at least 0.1 at −20° C. and 10 Hz.

According to a second aspect of the present invention, with the above-mentioned disk configuration wherein the pair of substrates are both formed of a resin or glass, the adhesive should have a glass transition temperature Tg of from −60° C. to −10° C., a Young's modulus of up to 100 kgf/mm$^2$ at −20° C. and 10 Hz, and a dynamic loss factor tan$\delta$ of at least 0.1 at −20° C. and 10 Hz. In a currently preferred embodiment, the information carrying means includes a recording layer which contains a rare earth metal. Also, the disk may further include a protective coating of a resin on the recording layer.

The optical disk according to the first aspect of the invention is of the construction wherein one substrate formed of glass and another substrate of a resin, at least one of which bears information carrying means thereon, are integrated and bonded with an adhesive having a glass transition temperature Tg between −60° C. and −10° C. Even when the disk is stored under severe thermal conditions, for example, at temperatures varying between −20° C. and 55° C., the adhesive layer will accommodate or damp any stresses and strains which can be induced between the glass substrate and the resinous substrate, between the substrate and a protective coating or another layer, or between such layers, thereby completely preventing delamination. There is thus obtained a lightweight, rigid, reliable optical disk in which one substrate is formed of glass and the other substrate is formed of a resin. The disk can accommodate high speed rotation at 1,800 rpm or higher, especially at 3,000 rpm or higher without dynamic axial runout or deflection. Since one of the substrate is formed of resin, a failure of the optical disk upon accidental falling or scattering of glass fragments when failed can be prevented. The preferred form of optical disk wherein a recording layer as the information carrying means is formed on the glass substrate which is integrated with a resinous protective substrate avoids double refraction which can interfere with recording/reproducing operation. Since the glass substrate side on which recording/reproducing operation is conducted is resistant to heat and humidity, the disk as a whole is substantially free of distortion or degradation during long term storage under high or low-temperature and high or low-humidity conditions.

The optical disk according to the second aspect of the invention is of the construction wherein a pair of substrates both formed of glass or resin, at least one of which bears information carrying means thereon, are integrated and bonded with an adhesive having a specific glass transition temperature, Young's modulus, and dynamic loss factor. The adhesive layer will accommodate or damp any stresses and strains which can be induced between the substrates, between the substrate and a protective coating or another layer, or between such layers. Even when the disk is stored under severe thermal conditions, for example, at temperatures varying from −30° C. to 65° C. or vice verse at a rate of 20° C./sec., no separation occurs between the substrates, between the substrate and the layer, or between the layers. There is thus obtained a reliable optical disk.

The information carrying means used herein is defined as encompassing both a recording layer having information previously carried therein as in read only disks and a recording layer in which information can be introduced as in recording/reproducing disks.

BRIEF DESCRIPTION OF THE DRAWING

The above and other objects, features, and advantages of the present invention will be better understood from the following description taken in conjunction with the accompanying drawing, in which.

the only figure.

DESCRIPTION OF THE PREFERRED EMBODIMENTS

Figure 1:
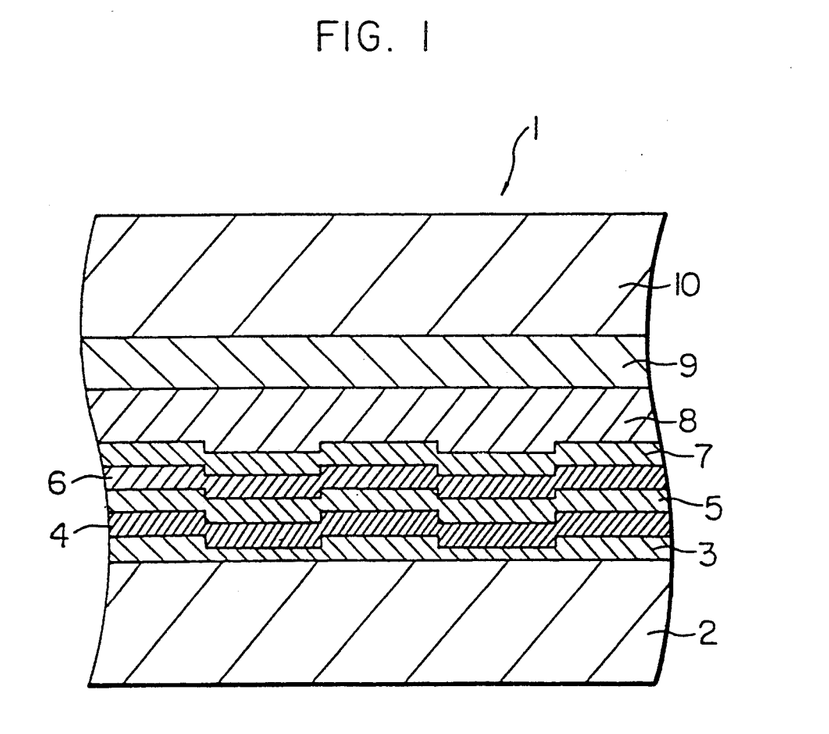
FIG. 1 is a fragmentary cross-section of an optical disk according to one embodiment of the invention.

Referring to FIG. 1, a magnetooptical recording disk is illustrated in fragmentary cross-section as one preferred embodiment of the optical disk according to the invention.

The magnetooptical recording disk generally designated at 1 includes a substrate 2. The disk 1 has a resin layer 3, a protective layer 4, an intermediate layer 5, a recording layer 6 as information carrying means, a protective layer 7, a protective coating 8, an adhesive layer 9, and a protective substrate 10 stacked one on top of another on the substrate 2 in the stated order.

The substrate 2 should be transparent to recording and reproducing light and may be formed of glass or resins. Glass is preferred because the glass substrate is fully resistant against heat and humidity and substantially free of double refraction.

The substrate 2 is generally of a disk or circular shape having a diameter of about 50 mm to about 360 mm and a thickness of about 0.5 mm to about 2 mm.

When the substrate 2 of resin is used, a rigid resin is preferred. The resin of which the substrate is formed is not particularly limited, but preferably selected from acrylic resins, polycarbonates, epoxy resins, polymethylpentene, and polyolefins. The substrate may be formed from such a resin by any well-known method, for example, injection molding. Preferably, a predetermined pattern including pits and grooves for tracking and addressing purposes is formed on the substrate surface at the same time as substrate molding. In the case of the resinous substrate 2, the resinous layer 3 is generally omitted.

When the substrate 2 of glass is used, it is preferably formed of tempered glass. Higher rigidity, weatherability and durability are obtained with the use of tempered glass. The tempered glasses are generally classified into physically tempered glasses and chemically tempered glasses in terms of their strengthening method, and a choice may be made for a particular use. The tempered glass used herein is not particularly limited, that is, any of conventional tempered glasses may be used.

Among the tempered glasses, preferred are glasses surface tempered by chemical strengthening. In general, glass is chemically tempered by replacing alkali metal ions in proximity of the glass surface by alkali metal ions of another species from the exterior whereby compression stresses are induced at the glass surface by the difference in the spatial volume occupied by the ions, thereby increasing mechanical strength. Chemical tempering is generally carried out by heating an alkali metal salt such as a nitrate and sulfate salt and dipping the glass in the molten salt for several hours to several ten hours. More illustratively, soda glass may be strengthened by using $KNO_3$ as the molten alkali salt to thereby substitute K ions for Na ions in the glass. Lithium-containing glass may be strengthened by dipping it in $NaNO_3$ to substitute Na ions for Li ions in the glass. Such surface tempered glasses are described in U.S. Pat. No. 3,287,200 and Japanese Patent Application Kokai Nos. 43819/1987 and 175219/1988. Since the strengthened or compression stressed layer is present only in proximity to the glass surface, there results a surface tempered glass. The strengthened or compression stressed layer is preferably 10 to 200 $\mu$m, more preferably 30 to 75 $\mu$m thick.

The chemically tempered glass may be a soda-lime silicate glass as chemically tempered by the above method. An aluminosilicate glass as chemically tempered is more preferred because of its increased mechanical strength. The aluminosilicate glass preferably has an $Al_2O_3$ content of at least 10% by weight, especially 15 to 30% by weight. The preferred aluminosilicate glass used herein has the following composition:

| | |
|---|---|
| $SiO_2$ | 50 to 60% by weight |
| $Al_2O_3$ | 15 to 30% by weight |
| $B_2O_3$ | 1 to 10% by weight |
| $R(I)_2O$ | 10 to 25% by weight |
| $R(II)O$ | 1 to 10% by weight |
| $TiO_2$, etc. | 0 to 5% by weight | wherein R(I) and R(II) are monovalent and divalent metals, respectively, with the $K^+$ substitution being in the range of 0.01 to 1 $mg/cm^3$.

The resin layer 3 is preferably formed on the substrate 2 when the substrate is of glass. Most often the resin layer 3 on the surface has a predetermined pattern in the form of pits or grooves for tracking, addressing or other purposes. Instead of forming the resin layer, the substrate may be formed with such a pattern by chemical etching.

The resin of which the layer 3 is formed is not particularly limited and may be selected from well-known resins used in the photopolymer method known as 2P method. Most often, radiation-curable compounds are used in the 2P method. For example, use may be made of a mixture of two or three monomers belonging to the group of polyfunctional ester acrylates, polyfunctional urethane acrylates, and polyfunctional epoxy acrylates, or a mixture of such a monomer and another monomer such as polyester acrylate, oligoester acrylate, polyurethane acrylate, and oligourethane acrylate, with a photopolymerization initiator such as Irg-907 and Irg-651 added thereto.

The resin layer 3 is preferably formed by the 2P method. More particularly, a radiation-curable compound is extended over the surface of a stamper having a predetermined pattern. A glass substrate is pressed onto the radiation-curable compound layer under pressure. This pressing causes the stamper pattern to be transferred to the layer surface. Then radiation is irradiated to the layer through the glass substrate to cure the resin layer to the glass substrate. Finally the resin layer is removed from the stamper. In this way, a resin layer having the stamper pattern transferred thereon is formed on the major surface of a glass substrate.

The resin layer 3 preferably has a thickness of 5 to 100 $\mu$m, more preferably 10 to 30 $\mu$m.

The intermediate layer 5 is provided for the purpose of carrier-to-noise (C/N) ratio improvement. It is preferably formed from a dielectric substance to a thickness of about 30 to 150 nm. Its manufacture is preferably by gas phase film formation techniques such as sputtering. The dielectric substances used herein include oxides, nitrides, and mixtures thereof.

A similar dielectric substance may be applied onto the recording layer 6 to form the protective layer 7 thereon in addition to the intermediate layer 5. When both the intermediate and protective layers 5 and 7 are formed, their composition may be the same or different.

The protective layers 4 and 7 are provided on the opposite sides of the recording layer 6 for the purpose of improving the corrosion resistance of the recording layer 6. Preferably at least one, more preferably both of the protective layers 4 and 7 are provided. These protective layers are preferably inorganic thin films of various oxides, carbides, nitrides, sulfides, and mixtures thereof. The intermediate layer-forming material may also be used.

The protective layers preferably have a thickness of about 30 to 300 nm to achieve a corrosion resistance improvement. They are preferably formed by gas phase film formation techniques such as sputtering.

The recording layer 6 is a layer in which information is magnetically recorded by means of a modulated thermal beam or a modulated magnetic field and the recorded information is reproduced through magneto-optical conversion.

The material of the recording layer 6 is not particularly limited insofar as magnetooptical recording is possible. Preferably, an alloy of a rare earth metal and a transition metal is sputtered or vacuum deposited to form an amorphous film. The rare earth metals used herein include Tb, Dy, Nd, Gd, Sm, and Ce, and mixtures thereof. The transition metals include Fe and Co. The alloy preferably contains Fe and Co in a total content of 65 to 85 atom %, with the balance being substantially a rare earth metal or metals. The preferred recording layer has a composition: TbFeCo, DyTbFeCo, NdDyFeCo, NdGdFeCo, and the like. The recording layer may contain up to 10 atom % of an additional metal or metals selected from Cr, Al, Ti, Pt, Si, Mo, Mn, V, Ni, Cu, Zn, Ge, and Au. Also, the recording layer may contain up to 10 atom % of another rare earth metal or metals selected from Sc, Y, La, Ce, Pr, Pm, Sm, Eu, Ho, Er, Tm, Yb, and Lu.

The recording layer 6 generally has a thickness of about 10 to about 1,000 nm.

The recording layer may be formed by dry coating techniques such as evaporation, sputtering, and ion plating.

The protective coating 8 is provided for the purpose of improving corrosion resistance and mar resistance. It may be formed from various organic materials, preferably by curing a radiation-curable compound having an acrylic double bond and capable of curing upon exposure to radiation such as electron radiation and UV. A typical example of the radiation-curable compound from which the protective coating 8 is formed is a group of oligoester acrylates.

The oligoester acrylates are oligoester compounds having at least two acrylate or methacrylate groups. Preferred oligoester acrylates have a molecular weight of 1,000 to 10,000, more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups.

These polyfunctional oligoester acrylates are commercially available under the trade names of Aronix M-7100, M-5400, M-5500, M-5700, M-6250, M-6500, M-8030, M-8060, M-8100, etc. from Toa Synthetic K. K. They are represented by the following formulae.

In the formulae, A is an acrylate or methacrylate group, M is a dihydric alcohol residue (for example, ethylene glycol, diethylene glycol, 1,6-hexane glycol, and bisphenol-A), N is a dibasic acid residue (for example, terephthalic acid, isophthalic acid, adipic acid, and succinic acid), and letter n is a number of 1 to 10, especially 2 to 5. The polyfunctional oligoester acrylates of formula (I) are especially preferred.

The oligoester acrylates may be used alone or in combination with another radiation-curable compound. In the latter case, the oligoester acrylate is preferably present in an amount of at least 20% by weight in a mixture thereof with the radiation-curable compound.

The radiation-curable compounds used in combination with the oligoester acrylates include monomers, oligomers, and polymers having incorporated in their molecule a group capable of crosslinking or polymerization upon exposure to radiation, for example, an acrylic double bond as given by acrylic acid, methacrylic acid and their esters which are sensitive to an ionization energy and capable of radical polymerization, an allyl double bond as given by diallyl phthalate, and an unsaturated double bond as given by maleic acid and maleic derivatives. They are preferably poly-functional, especially at least trifunctional.

The radiation-curable monomers are usually compounds having a molecular weight of lower than 2,000 and the oligomers are those having a molecular weight of 2,000 to 10,000.

Examples include styrene, ethylacrylate, ethylene glycol diacrylate, ethylene glycol dimethacrylate, diethylene glycol diacrylate, diethylene glycol methacrylate, 1,6-hexaneglycol diacrylate, 1,6-hexaneglycol dimethacrylate, and more preferably pentaerythritol tetraacrylate (and methacrylate), pentaerythritol triacrylate (and methacrylate), trimethylolpropane triacrylate (and methacrylate), trimethylolpropane diacrylate (and methacrylate), acryl modified products of urethane elastomers (e.g., Nippolane 4040 available from Nippon Polyurethane K.K.), and derivatives thereof having a functional group such as COOH incorporated therein, acrylates and methacrylates of phenol ethylene oxide adducts, compounds having a pentaerythritol fused ring and having an acryl or methacryl group or s caprolactone-acryl group attached thereto as disclosed in Japanese Patent Application Kokai No. 165050/1989, and special acrylates as disclosed in Japanese Patent Application Kokai No. 165050/1989.

Examples of the radiation-curable oligomers include acryl modified urethane elastomers and their derivatives having a functional group such as COOH incorporated therein.

In addition to or instead of the above-mentioned compounds, radiation-curable compounds obtained by modifying thermoplastic resins so as to be radiation sensitive may be used. Examples of such radiation-curable resins include thermoplastic resins having incorporated in their molecule a group capable of crosslinking or polymerization upon exposure to radiation, for example, an acrylic double bond as given by acrylic acid, methacrylic acid and their esters having a radically polymerizable unsaturated double bond, an allyl double bond as given by diallyl phthalate, and an unsaturated bond as given by maleic acid and maleic derivatives.

Examples of the thermoplastic resins which can be modified to be radiation curable include vinyl chloride copolymers, saturated polyester resins, polyvinyl alcohol resins, epoxy resins, phenoxy resins, and cellulosic derivatives.

Other resins which can be modified to be radiation curable include polyfunctional polyesters, polyether ester resins, polyvinyl pyrrolidone resins and derivatives thereof (e.g., PVP olefin copolymers), polyamide resins, polyimide resins, phenolic resins, spiroacetal resins, and acrylic resins containing at least one acryl ester and methacryl ester containing a hydroxyl group as a polymerizing component.

The protective coating 8 of such a radiation-curable compound preferably has a thickness of from about 0.1 to 100 μm, more preferably from about 5 to 30 μm. A protective coating of thinner than 0.1 μm is often difficult to form uniformly and insufficient as a moisture barrier in a humid atmosphere so that the underlying recording layer becomes less durable. A protective coating of thicker than 100 μm tends to invite distortion of the overall disk and cracking of the protective coating itself due to shrinkage upon curing.

The protective coating may be formed by any desired well-known technique, for example, spinner coating, gravure coating, spraying, dipping, and combinations thereof. The conditions under which the protective coating is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred.

Where UV is used, a photopolymerization sensitizer is generally added to the radiation-curable compounds. The photopolymerization sensitizer used herein is preferably selected from the compounds described in Japanese Patent Application Kokai No. 165050/1989.

The protective substrate 10 is provided for the purpose of protecting the recording layer 6 from a damage.

In the first form of the invention, the protective substrate 10 is formed of resin for the glass substrate 2, but of glass for the resinous substrate 2. There is obtained a lightweight, rigid disk by forming one of the pair of substrates 2 and 10 from glass and the other one from resin. The disk can be satisfactorily operated at high speeds of 3,000 rpm or higher without dynamic axial runout. The use of a resin as one of the substrates not only contributes to a weight reduction of the disk, but also prevents the glass substrate from going into fragments upon a failure by accidental falling or glass fragments from scattering when failed. In a preferred embodiment, the disk is manufactured by uniting the substrate 2 of glass with the protective substrate 10 of resin. The disk of glass/resin substrate combination has the benefits of avoidance of double refraction, improved weatherability and durability, and minimized dynamic axial runout during high speed rotation.

In the second form of the invention, the protective substrate 10 is formed of glass for the glass substrate 2, but of resin for the resinous substrate 2, with the benefit of minimized influence of thermal expansion.

The glass or resin of which the protective substrate 10 is formed is not particularly limited. The protective substrate 10 can be opaque because recording/reproducing operation is most often conducted on the substrate 2 side. If the protective substrate 10 is formed of a transparent glass or resin, then recording/reproducing operation can also be conducted on the protective substrate 10 side.

For the glassy protective substrate 10, the glasses which are previously described for the glassy substrate 2 may be used. Tempered glasses, especially chemically tempered glasses are preferred.

The resin of which the protective substrate 10 is formed is preferably a rigid resin selected from polycarbonates, acrylic resins, and polyolefins. Preferably, the resin protective substrate is so rigid that the substrate undergoes an axial deflection of less than 500 μm, most preferably less than 300 μm and a dynamic axial runout of less than 500 μm, most preferably less than 300 μm, both as measured at a diameter of 200 mm.

The protective substrate 10 generally has a thickness of about 0.5 to about 2.0 mm to provide rigidity. The protective substrate 10 has a shape conforming to the substrate 2.

The protective substrate 10 is bonded to the substrate 2 through the adhesive layer 9. Q The adhesive should have a glass transition temperature Tg of from $-60°$ C. to $-10°$ C., preferably from $-40°$ C. to $-15°$ C. Adhesives with lower Tg have a lower flow point (FP) so that they will readily flow away at high temperatures, for example, at about 45° to 50° C. Adhesives with higher Tg will lose bonding forces at low temperatures, for example, at about $-10°$ C.

The flow point (FP) also known as pour point is the temperature at which the adhesive will flow. The glass transition temperature Tg and flow point FP of an adhesive are generally measured by a forced vibration method at an excitation frequency of 10 Hz (sine wave) using a viscoelastic meter. Tg is determined from the temperature at which a peak of loss elastic modulus E" is reached and FP is determined from the temperature higher than Tg at which Young's modulus E' shows a rapid decline. The adhesives having Tg within the above-defined range generally have a flow point FP in the range of from 60° C. to 70° C.

The adhesive should have a Young's modulus E' of from 0.005 to 0.1 kgf/m$^2$, especially 0.01 to 0.08 kgf/mm$^2$ at $-20°$ C. and 10 Hz. Preferably, the adhesive has a Young's modulus E' of up to 100 kgf/mm, especially 3 to 100 kgf/mm$^2$ at $-20°$ C. and 10 Hz. With a higher Young's modulus outside the range, the adhesive layer 9 would become less effective in accommodating or mitigating stresses and strains which can be induced between the substrates 2 and 10, between the substrate and the protective coating 8 or other layers, and between the intervening layers. For example, in the first form, the protective coating 8 or other layers can sometimes separate from the substrate 2 under severe conditions at temperatures varying between $-20°$ C. and 55° C. In the second form, the protective coating 8 or other layers can sometimes separate from the substrate 2 under severe conditions at temperatures varying between $-30°$ C. and 65° C. at a rate of 20° C./sec.

A lower Young's modulus outside the range implies that the Young's modulus at higher temperatures is too low to provide bonding forces. For the above-mentioned reasons, the adhesive should preferably have a Young's modulus E' of from 0.01 to 0.08 kgf/mm$^2$ at $+20°$ C. and 10 Hz and 3 to 100 kgf/mm$^2$ at $-20°$ C. and 10 Hz.

Preferably, the adhesive has a dynamic loss factor tanδ of at least 0.1, especially 0.2 to 1.5 at $-20°$ C. and 10 Hz and at least 0.4, especially 0.5 to 5 at $+20°$ C. and 10 Hz. With a lower dynamic loss factor tanδ outside the range, the adhesive becomes less sticky, providing less bonding forces. For example, in the first form, the adhesive layer 9 can sometimes separate from the substrate 2, protective substrate 10, protective coating 8 or other layers under severe conditions at temperatures varying between $-20°$ C. and 55° C. In the second form, the adhesive layer 9 can sometimes separate from the substrate 2, protective substrate 10, protective coating 8 or other layers under severe conditions at temperatures varying between $-30°$ C. and 65° C. at a rate of 20° C./sec.

With a higher dynamic loss factor tanδ outside the range, the protective substrate 10 can be displaced when the substrate 2 deflects or upon application of external stresses or impact. For the above-mentioned reasons, the adhesive should preferably have a dynamic loss factor tanδ of from 0.2 to 1.5 at $-20°$ C./10 Hz and from 0.5 to 5 at $+20°$ C./10 Hz.

The Young's modulus E' and dynamic loss factor tanδ of an adhesive are measured, for example, by applying the adhesive to release paper to a thickness of 100 to 500 μm using a roll coater. After drying, the adhesive coating is stripped from the release paper and set in a viscoelastic meter with which measurement is made by a forced vibration method at an excitation frequency of 10 Hz (sine wave) and temperatures between $-50°$ C. and 80° C.

Hot-melt adhesives are preferred adhesives having the above-mentioned properties. In general, the hot-melt adhesive contains a base polymer and additives such as a tackifier, softener, plasticizer, and wax. The ingredients of the adhesive are not particularly limited. Preferably, the base polymer is selected from polyolefinic resins including polyethylene, polypropylene, polystyrene, copolymers thereof, and mixtures thereof. Another polyolefin, polyolefinic copolymer or synthetic rubber may be added, if desired. Among the polyolefinic resins, preferred are polystyrene-polypropylene copolymers, polystyrene-polyisoprene copolymers, and polystyrene polybutadiene copolymers. Polystyrene-atactic polypropylene copolymers and polystyrene-polyisoprene copolymers are especially preferred. The base polymer should preferably have a molecular weight of about 100,000 to about 300,000.

The preferred adhesive is comprised of 100 parts by weight of the base polymer and 100 to 600 parts by weight of a tackifier. The tackifier may be selected from various natural resins, modified ones thereof, and various synthetic resins, with rosin, rosin derivatives, pinene resin, and petroleum resin being preferred.

The preferred adhesive may further contain 0 to 100 parts by weight of a softener per 100 parts by weight of the base polymer. The softener may be selected from various well-known softeners.

A plasticizer and wax may be added if necessary. The plasticizer is usually selected from phthalate esters, phosphate esters, fatty acid esters, adipate esters, polyhydric alcohol esters, and epoxy compounds. The wax may be paraffin wax, low-molecular weight polyethylene wax or the like. Furthermore, a ultraviolet absorber, filler and antioxidant may be added if necessary.

In practice, a hot-melt adhesive may be applied by means of a roll coater.

The adhesive layer 9 is preferably about 10 to about 100 μm thick, especially about 50 to about 80 μm thick. Outside the range, thinner adhesive layers often provide less bonding forces whereas thicker adhesive layers are less durable.

The use of the adhesive having the above-defined properties according to the invention ensures a firm bond between the substrate 2 of glass and the protective substrate 10 of resin having different coefficients of thermal expansion. The adhesive layer 9 accommodates the differential thermal expansion between the components. More particularly the adhesive layer 9 accommodates or reduces stresses and strains which can be induced into the substrate 2, protective substrate 10, and intervening layers and between them, minimizing delamination during high or low-temperature shelf storage. For instance, no separation occurs between the adjoining two components of the substrate 2, protective substrate 10, and intervening layers when the optical disk in the first form is maintained under severe conditions at temperatures varying between −20° C. and 55° C. Also, no separation occurs between the adjoining two components of the substrate 2, protective substrate 10, and intervening layers when the optical disk in the second form is maintained under severe conditions at temperatures varying between −30° C. and 65° C. at a rate of 20° C./sec. The benefits become prominent when substrates of a resin having a higher coefficient of thermal expansion than glass are used. It is to be noted that glasses generally have a coefficient of thermal expansion of about $8 \times 10^{-6}$ to $9 \times 10^{-6}$/deg and resins generally have a coefficient of thermal expansion of about $5 \times 10^{-5}$ to $6 \times 10^{-5}$/deg.

Although the optical disk of the invention has been described as being embodied by a magnetooptical recording disk of the single side recording type, the present invention is also applicable to optical recording disks of the double side recording type. The magnetooptical recording disk of the double side recording type is obtained by uniting a substrate having recording and other necessary layers and another substrate having recording and other necessary layers through an adhesive layer such that the recording layers are interposed therebetween. The disk of this type have the same benefits as available for the disk of the single side recording type mentioned above.

The present invention is also applicable to optical recording disks having a phase transition recording layer which utilizes a change of reflectivity for recording and reproducing operation. The recording layer of this type includes Te and Se base alloys as disclosed in Japanese Patent Publication No. 41902/1979 and Japanese Patent No. 1004835, Te oxides as disclosed in Japanese Patent Application Kokai No. 54338/1983 and Japanese Patent Nos. 974257 and 974258, and other Te and Se base chalcogenides; alloys capable of amorphous.crystalline transition such as Ge-Sn and Si-Sn; and alloys capable of producing a color change through a crystal structure change such as Ag-Zn, Ag-Al-Cu, and Cu-Al and alloys capable of producing a grain size change such as In-Sb.

Furthermore, the present invention is applicable to optical recording disks having a pit-forming recording layer which utilizes a change of reflectivity due to pit formation. The recording layer of this type is formed from dyes such as cyanine, phthalocyanine, naphthalocyanine, anthraquinone, azo, triphenylmethane, pyrylium, and thiapyrylium salt dyes, and Te base materials.

The invention also encompasses read only optical disks.

Preferred are those optical recording disks having a recording layer containing a corrodible metal such as rare earth metals.

Even in the embodiment of the present disk which has the protective substrate 10 of a resin, the protective coating 8 can prevent further penetration of oxygen and moisture through the resin. The disk is thus highly reliable particularly when the protective coating 8 has a thickness of 1 to 100 μm and the protective substrate 10 has a thickness of 0.5 to 2.0 mm.

Great benefits are obtained when the protective substrate 10 of a resin is bonded to the substrate 2 of glass through the protective coating 8 and the adhesive layer 9. In general, the glass has a coefficient of the order of 8 or $9 \times 10^{-6}$/deg and the resin has a coefficient of the order of 5 or $6 \times 10^{-5}$/deg. Not only the adhesive layer 9, but also the protective coating 8 can accommodate the differential thermal expansion between the glass and the resin. The disk is stable during storage both at high and low temperatures.

The optical disk is operated for recording and reproduction by driving at 100 r.p.m. or higher. The recording and reproducing operation may be in accord with the conventional well-known methods. In particular, the disk of the first form of the invention can maintain its performance even when it is operated at 1,800 r.p.m. or higher, especially 3,000 r.p.m., most preferably 3,000 to 5,000 r.p.m.

EXAMPLE

Examples of the invention are given below by way of illustration and not by way of limitation.

EXAMPLE 1

A magnetooptical recording disk of the single side recording type configuration as shown in FIG. 1 was prepared by successively forming a resin layer 3, a protective layer 4 of glass, an intermediate layer 5 of SiNx, a recording layer 6 of TbFeCo, a protective layer 7 of SiNx, and a protective coating 8 on a glass substrate 2 in the stated order. Finally, a protective plate 10 of a resin was bonded to the protective coating 8 through an adhesive layer 9.

The glass substrate 2 was a disk of chemically tempered aluminosilicate glass having an outer diameter of 200 mm and a thickness of 1.2 mm.

The protective substrate 10 was a disk of polycarbonate having the same dimensions as the glass substrate 2.

The resin layer 3 was formed by the 2P method and had a tracking groove on the surface. The protective layer 4, intermediate layer 5, recording layer 6, and protective layer 7 were formed by sputtering. The protective coating 8 was formed to a thickness of 10 μm by coating an oligoester acrylate and exposing to UV radiation for crosslinking and curing. The adhesive was applied by means of a roll coater to form the adhesive layer 9 of 80 μm thick.

In this manner, magnetooptical recording disk Nos. 1 to 6 were prepared using different adhesive compositions. The adhesive compositions were hot.melt adhesive compositions comprising the base polymer identified below in admixture with petroleum resin, pinene resin and other additives. Base polymers corresponding to disk Nos. 1 to 5 are designated Base polymers 1 to 5, respectively. Base polymers 1 and 2 are within the scope of the invention and Base polymers 3 to 5 are outside the scope of the invention. Additionally, disk No. 6 was prepared using the hot-melt adhesive described in U.S. Pat. No. 4,503,531, column 2, lines 44–57 comprising a polystyrene-polyisoprene block copolymer as a base polymer.

Base polymer 1:
100% by weight of polystyrene atactic polypropylene copolymer having a molecular weight of 100,000

Base polymer 2:
15% by weight of styrene-polyisoprene copolymer having a molecular weight of 120,000 and 85% by weight of styrene-polyisoprene copolymer having a molecular weight of 230,000

Base polymer 3:
20% by weight of styrene-atactic polypropylene copolymer having a molecular weight of 70,000 and 80% by weight of styrene-atactic polypropylene copolymer having a molecular weight of 130,000

Base polymer 4:
a blend of polystyrene and polybutadiene

Base polymer 5:
a blend of polystyrene and polyisoprene

Base polymer 6:
polystyrene-polyisoprene block copolymer (U.S. Pat. No. 4,503,531)

The adhesives used in the disks had the glass transition temperature (Tg), flow point (FP), Young's modulus (E'), and dynamic loss factor (tanδ) reported in Table 1. The glass transition temperature (Tg) and flow point (FP) of the adhesive were measured by a forced vibration method at an excitation frequency of 10 Hz (sine wave) using a viscoelastic spectrometer manufactured by Iwamoto Mfg. K.K. The Young's modulus (E') and dynamic loss factor (tanδ) at −20° C. and 10 Hz and at +20° C. and 10 Hz of the adhesive were measured by applying the adhesive to release paper to a thickness of 100 to 500 μm using a roll coater. After drying, the adhesive coating was stripped from the release paper and set in a viscoelastic spectrometer manufactured by Iwamoto Mfg. K.K. Measurement was made by a forced vibration method at an excitation frequency of 10 Hz (sine wave) and temperatures between −50° C. and 80° C.

The disks were examined by the following tests.

THERMAL SHOCK TEST

A disk was maintained for 30 minutes in an atmosphere at −20° C. Then the temperature of the atmosphere where the disk remained was quickly increased to 55° C. within 5 seconds. The disk was maintained for 30 minutes in the same atmosphere at 55° C. Thereafter, the temperature was quickly reduced back to −20° C. within 5 seconds. This was one cycle. The test included 20 cycles. The disk was examined for separation. The result is reported in terms of separated samples/10 samples.

THERMAL CYCLING TEST

A disk was maintained for 4½ hours in an atmosphere at −20° C. Then the temperature of the atmosphere where the disk remained was increased to 55° C. at a rate of 10° C./hour and a relative humidity (RH) of 80% was set. The disk was maintained for 4½ hours in the same atmosphere at 55° C. and RH 80%. Thereafter, the temperature was reduced back to −20° C. at a rate of 10° C./hour. This was one cycle. The test included 14 cycles. The disk was examined for separation. The result is reported in terms of separated samples/10 samples.

The results are shown in Table 1.

TABLE 1

| Sample No. | Tg (°C.) | FP (°C.) | E' (kgf/mm$^2$) −20° C. | E' (kgf/mm$^2$) +20° C. | tan δ −20° C. | tan δ +20° C. | Thermal shock | Thermal cycling |
|---|---|---|---|---|---|---|---|---|
| 1 | −19 | 65 | 68.8 | 0.04 | 0.289 | 3.824 | 0/10 | 0/10 |
| 2 | −40 | 71 | 3.7 | 0.03 | 1.339 | 0.741 | 0/10 | 0/10 |
| 3* | −8 | 79 | 124.4 | 3.4 | 0.072 | 0.559 | 8/10 | 10/10 |
| 4* | −4 | 57 | 120.4 | 2.5 | 0.063 | 0.983 | 9/10 | 10/10 |
| 5* | −9 | 70 | 129.6 | 2.7 | 0.080 | 0.603 | 10/10 | 10/10 |
| 6* | −20 | 62 | 72.8 | 0.5 | 0.196 | 1.605 | 6/10 | 7/10 |

*outside the scope of the invention

The effectiveness of the invention is evident from Table 1. As seen from Table 1, for disk Nos. 3 to 6 (comparison), separation occurred in 7 to 10 samples among ten samples in the thermal shock test because of their higher Young's modulus at +20° C.

In the thermal shock and thermal cycling tests, separation between the glass substrate 2 and the resinous protective substrates 10 actually occurred between the adhesive layer 9 and the protective coating 8.

EXAMPLE 2

A magnetooptical recording disk of the single side recording type configuration as shown in FIG. 1 was prepared by successively forming a protective layer 4 of glass, an intermediate layer 5 of SiNx, a recording layer 6 of TbFeCo, a protective layer 7 of SiNx, and a protective coating 8 on a resinous substrate 2 in the stated order. Finally, a protective plate 10 of a resin was bonded to the protective coating 8 through an adhesive layer 9.

The resinous substrate 2 was a disk of polycarbonate having an outer diameter of 200 mm and a thickness of 1.2 mm. An annular member having a tracking groove on one surface was prepared by injection molding.

The protective substrate 10 was a disk of polycarbonate injection molded to the same dimensions as the glass substrate 2.

The protective layer 4, intermediate layer 5, recording layer 6, and protective layer 7 were formed by sputtering. The protective coating 8 was formed to a thickness of 10 μm by coating an oligoester acrylate and exposing to UV radiation for crosslinking and curing. The adhesive was applied by means of a roll coater to form the adhesive layer 9 of 80 μm thick.

In this manner, magnetooptical recording disk Nos. 11 to 16 were prepared using different adhesive compositions. The adhesive compositions were hot-melt adhesive compositions comprising the base polymer in admixture with petroleum resin, pinene resin and other additives. The same Base polymers 1 to 6 as used in Example 1 were used in disk Nos. 11 to 16, respectively.

The adhesives used in the disks had the glass transition temperature (Tg), flow point (FP), Young's modulus (E'), and dynamic loss factor (tanδ) reported in Table 2.

The disks were examined by the following tests.

THERMAL SHOCK TEST

A disk was maintained for 30 minutes in an atmosphere at −30° C. Then the temperature of the atmosphere where the disk remained was quickly increased to 65° C. within 5 seconds. The disk was maintained for 30 minutes in the same atmosphere at 65° C. Thereafter, the temperature was quickly reduced back to −30° C. within 5 seconds. This was one cycle. The test included 20 cycles. The disk was examined for separation. The result is reported in terms of separated samples/10 samples.

THERMAL CYCLING TEST

A disk was maintained for 4½ hours in an atmosphere at −30° C. Then the temperature of the atmosphere where the disk remained was increased to 65° C. at a rate of 10° C./hour and a relative humidity (RH) of 80% was set. The disk was maintained for 4½ hours in the same atmosphere at 65° C. and RH 80%. Thereafter, the temperature was reduced back to −30° C. at a rate of 10° C./hour. This was one cycle. The test included 14 cycles. The disk was examined for separation. The result is reported in terms of separated samples/10 samples.

The results are shown in Table 2.

Similarly, further magnetooptical recording disks were prepared by joining a substrate and a protective substrate both of glass. Equivalent results were found for these disks.

BENEFITS OF THE INVENTION

The optical disk in the first form of the invention wherein a pair of substrates are integrated so that information carrying means is interposed therebetween prevents any damage to the information carrying means, for example, recording layer. Since one of the pair of substrates is of glass and the other one of the substrates is of resin, the disk is fully rigid and lightweight. The disk provides stable operation at high rotation speeds of 1,800 rpm or higher, especially 3000 rpm or higher without dynamic axial runout or deflection. The disk assures satisfactory recording/reproducing operation at high rotation speeds. The use of resin as one of the substrates prevents a failure of the optical disk upon accidental falling or scattering of glass fragments when failed.

The glass and resin substrates are integrated and bonded with an adhesive having a glass transition temperature Tg between −60° C. and −10° C. The adhesive layer can accommodate or damp any stresses and strains which can be induced between the glass substrate and the resinous substrate, between the substrate and the protective coating or other layer, or between such layers due to differential thermal expansion. Even when the disk is stored under severe thermal conditions, for example, at temperatures varying between −20° C. and 55° C., no separation occurs between the glass substrate and the resinous substrate, between the substrate and the protective coating or other layer, or between such layers. There is thus obtained a lightweight, rigid, reliable optical disk.

The preferred form of optical disk wherein the information carrying means in the form of a recording layer is formed on the glass substrate which is integrated with a resinous protective substrate is fully weather resistant and durable on the glass substrate side where recording/reproducing operation is conducted. The disk is substantially free of distortion or degradation during long term storage under high or low-temperature and high or low-humidity conditions. Double refraction is substantially avoided. Thus the disk ensures more accurate recording/reproducing operation.

The optical disk according to the second aspect of the invention wherein a pair of substrates both formed of glass or resin, at least one of which bears information carrying means thereon, are integrated so that the information carrying means is interposed therebetween prevents any damage to the information carrying means, for example, recording layer. The substrates are united and bonded with an adhesive having a specific glass

TABLE 2

| Sample No. | Tg (°C.) | FP (°C.) | E' (kgf/mm²) −20° C. | E' (kgf/mm²) +20° C. | tan δ −20° C. | tan δ +20° C. | Thermal shock | Thermal cycling |
|---|---|---|---|---|---|---|---|---|
| 11 | −19 | 65 | 68.8 | 0.04 | 0.289 | 3.824 | 0/10 | 0/10 |
| 12 | −40 | 71 | 3.7 | 0.03 | 1.339 | 0.741 | 0/10 | 0/10 |
| 13* | −8 | 79 | 124.4 | 3.4 | 0.072 | 0.559 | 10/10 | 7/10 |
| 14* | −4 | 57 | 120.4 | 2.5 | 0.063 | 0.983 | 10/10 | 8/10 |
| 15* | −9 | 70 | 129.6 | 2.7 | 0.080 | 0.603 | 9/10 | 7/10 |
| 16* | −20 | 62 | 72.8 | 0.5 | 0.196 | 1.605 | 5/10 | 6/10 |

*outside the scope of the invention

The effectiveness of the invention is evident from Table 2.

transition temperature, Young's modulus, and dynamic loss factor. The adhesive layer will accommodate any stresses and strains which can be induced between the substrates, between the substrate and the layer, or between the layers, even when the disk is stored under severe thermal conditions, for example, at temperatures varying between −30° C. and 65° C. at a rate of 20° C./sec. No separation occurs between the components. There is thus obtained a reliable optical disk.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical disk comprising a pair of substrates and information carrying means on at least one of the substrates, said pair of substrates being integrated through an adhesive so as to enclose the information carrying means therebetween, wherein one of said substrates is formed of glass, the other substrate is formed of a resin, and said adhesive has a glass transition temperature Tg of from −60° C. to −10° C. and a Young's modulus of from 0.005 to 0.1 kgf/mm$^2$ at 20° C. and 10 Hz.

2. The optical disk of claim 1 wherein said information carrying means is on the one substrate of glass which is integrated with the protective substrate of resin.

3. The optical disk of claim 1 or 2 wherein said information carrying means includes a recording layer.

4. The optical disk of claim 3 wherein said recording layer contains a rare earth metal and which further comprises a protective coating of a resin on said recording layer.

5. The optical disk of claim 1 wherein said adhesive has a Young's modulus of up to 100 kgf/mm$^2$ at −20° C. and 10 Hz.

6. The optical disk of claim 1 wherein said adhesive has a dynamic loss factor tan$\delta$ of at least 0.1 at −20° C. and 10 Hz.

* * * * *